Feb. 5, 1924.

B. G. NICE

BALL BEARING WHEEL

Filed Jan. 5, 1923

1,482,579

WITNESS:
Rob R Kitchel.

INVENTOR
Budd G. Nice
BY
Augustus B. Stoughton
ATTORNEY.

Patented Feb. 5, 1924.

1,482,579

UNITED STATES PATENT OFFICE.

BUDD G. NICE, OF OGONTZ, PENNSYLVANIA.

BALL-BEARING WHEEL.

Application filed January 5, 1923. Serial No. 610,815.

*To all whom it may concern:*

Be it known that I, BUDD G. NICE, a citizen of the United States, residing at Ogontz, in the county of Montgomery and State of Pennsylvania, have invented a new and useful Improvement in Ball-Bearing Wheels, of which the following is a specification.

The principal object of the present invention is to insure proper alignment of the elements of the wheel and to this end the invention comprises improvements in the construction and arrangement of certain of the parts as will hereinafter more fully appear.

The invention will be claimed at the end hereof but will be first described in connection with the embodiments of it chosen for illustration in the accompanying drawings forming part hereof and in which Figure 1 is a side view with parts broken away of a wheel embodying features of the invention.

Figure 1:
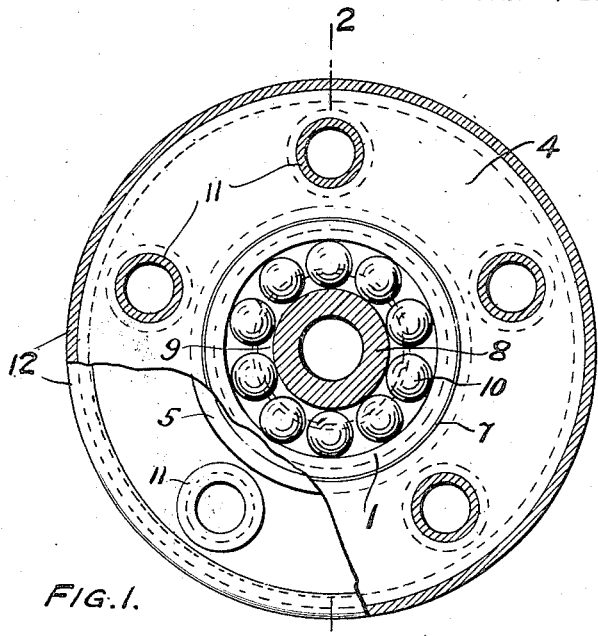
Figure 2:
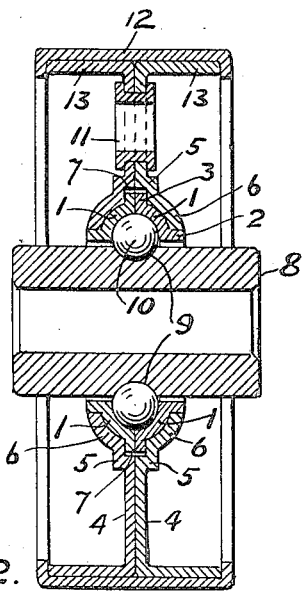
Fig. 2 is a sectional view taken on the line 2—2 of Figure 1.
Figure 3:
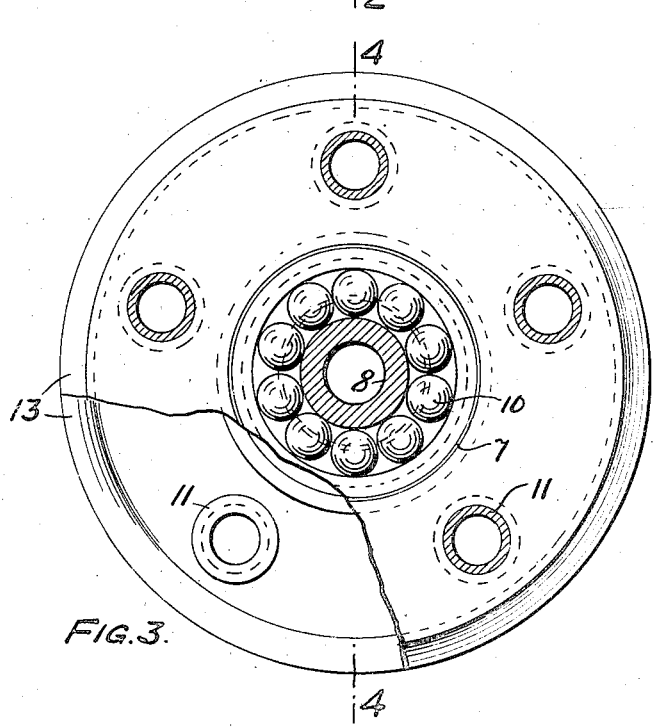
Fig. 3 is a view similar to Fig. 1 illustrating a modification of the invention.
Figure 4:
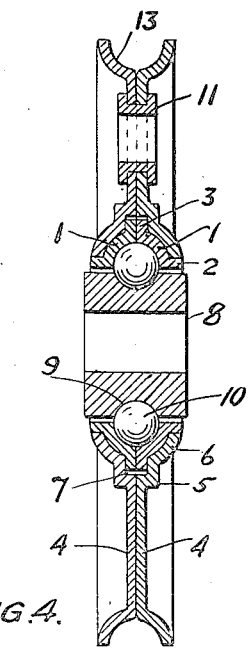
Fig. 4 is a view taken on the line 4—4 of Fig. 3.

There are a pair of duplicate concave disks of hard metal and a description of one will suffice. The concave disk 1 is concave on one face and convex on the other face and it is provided with a cylindrical axially ranging marginal flange 2 and with a flat radially ranging marginal flange 3. The flat radially ranging flanges 3 of a pair of these disks are arranged in facial contact to provide a ball race having an annular ball groove. 4 are webs of ring form arranged face to face and they are duplicates of each other so that a description of one will suffice. The web 4 is centrally provided with a flange consisting of an offset flat radially ranging portion 5 and of a concave portion 6. The faces of the radial portions 5 and of the radial flanges 3 are in contact and the rims of the concave portions 6 and the peripheral surfaces of the axial flanges 2 are in contact with clearance space 7 at the rims of the radial flanges 3 to insure alignment of the elements of the wheel. 8 is a hub having a ball groove 9. 10 is a circle of balls interposed between the groove 10 and the groove in the ball race. 11 are tubular rivets for securing the webs 4 together. 12 is a band encircling and crimped onto flanges 13 provided on the webs 4, as shown in Figs. 1 and 2, in which the wheel is suitable for use as a ground wheel for a truck and for other purposes. As shown in Figs. 3 and 4 there is no band and the webs are flanged to provide a peripheral groove 12 which adapts the wheel for use as a pulley.

I claim:

1. A ball bearing wheel comprising in combination a pair of duplicate concave disks each having a cylindrical axially ranging marginal flange and a flat radially ranging marginal flange, the flat radial flanges being arranged in facial contact to provide a ball race, webs of ring form arranged face to face and each centrally provided with a flange consisting of an offset flat radially ranging portion and of a concave portion, the faces of said radial portions and of said radial flanges being in contact and the rims of said concave portions and the peripheral surface of said axial flanges being in contact, with clearance space at the rims of the radial flanges, to insure alignment of the elements of the wheel, a hub having a ball groove, balls in said groove and race, and means for securing the webs together.

2. A ball bearing wheel comprising in combination a pair of duplicate concave disks each having a cylindrical axially ranging marginal flange and a flat radially ranging marginal flange, the flat radial flanges being arranged in facial contact to provide a ball race, webs of ring form arranged face to face and each centrally provided with a flange consisting of an offset flat radially ranging portion and of a concave portion, the faces of said radial portions and of said radial flanges being in contact and the rims of said concave portions and the peripheral surface of said axial flanges being in contact, with clearance space at the rims of the radial flanges to insure alignment of the elements of the wheel, a hub having a ball groove, balls in said groove and race, and tubular rivets for securing the webs.

3. A ball bearing wheel comprising in combination a pair of duplicate concave disks each having a cylindrical axially ranging marginal flange and a flat radially ranging marginal flange, the flat radial flanges being arranged in facial contact to provide a ball race, webs of ring form arranged face to face and each centrally provided with a flange consisting of an offset flat radially ranging portion and of a concave portion, the faces of said radial portions and of said radial flanges being in contact and the rims of said concave portions and the peripheral surface of said axial flanges being in contact, with clearance space at the rims of the radial flanges to insure alignment of the elements of the wheel, a hub having a ball groove, balls in said groove and race, tubular rivets for securing the webs, and a band encircling flanges provided on the webs.

4. In a wheel of the type recited the combination of duplicate concave disks constituting a race and provided with radial and axial flanges, and a pair of webs of ring form provided with flanges constituting a concavity conforming to the flanges of the race.

BUDD G. NICE.